Dec. 30, 1969    E. D. GEORGE    3,487,141
SYSTEM AND METHOD FOR THE MANUFACTURE OF POLYESTER AND THE LIKE
Filed July 14, 1967    4 Sheets-Sheet 1

INVENTOR.
EVERETT D. GEORGE
BY
*M W Jackson*
ATTORNEY

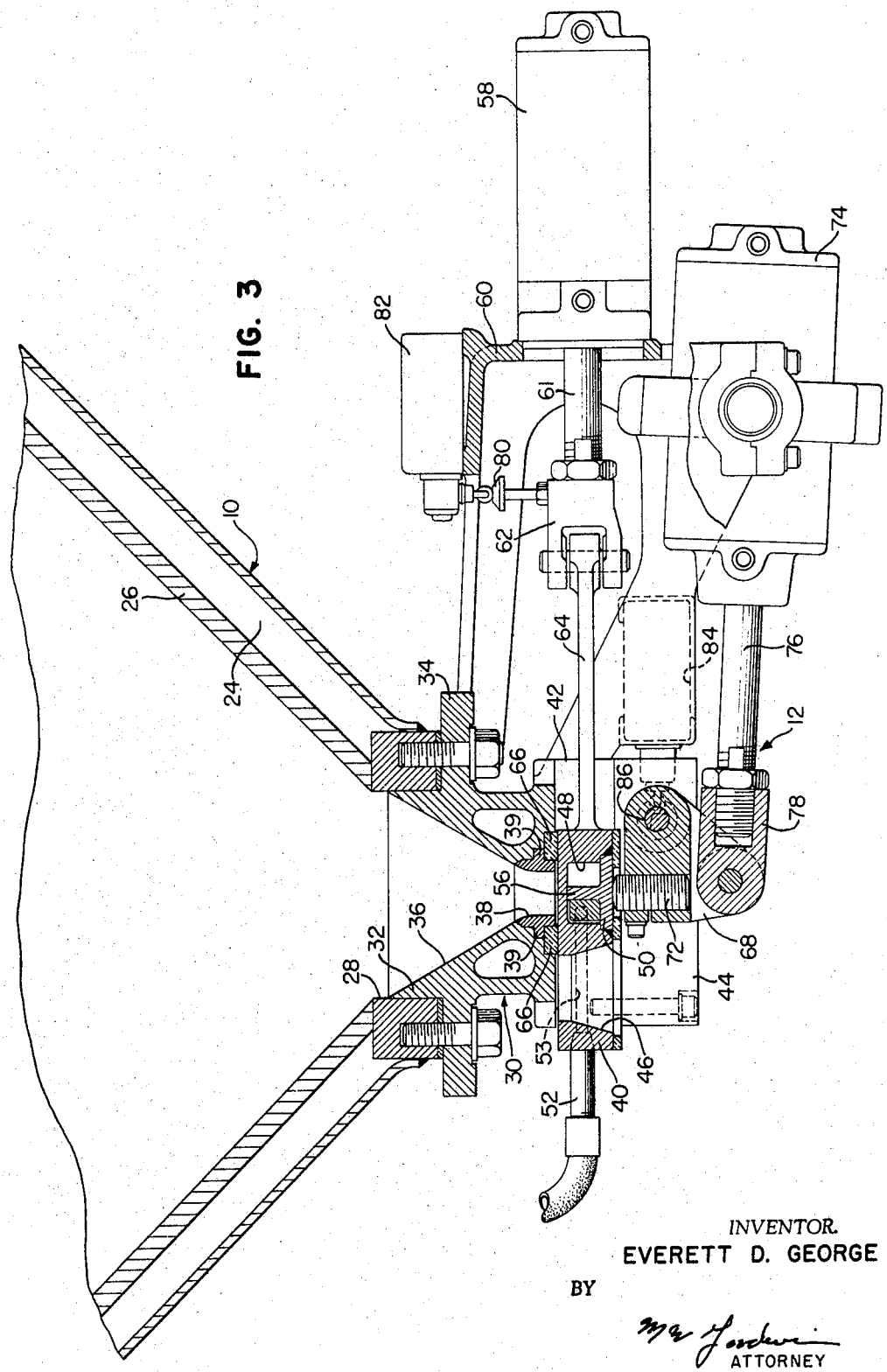

Dec. 30, 1969　　　E. D. GEORGE　　　3,487,141
SYSTEM AND METHOD FOR THE MANUFACTURE OF POLYESTER AND THE LIKE
Filed July 14, 1967　　　　　　　　　　　　4 Sheets-Sheet 3
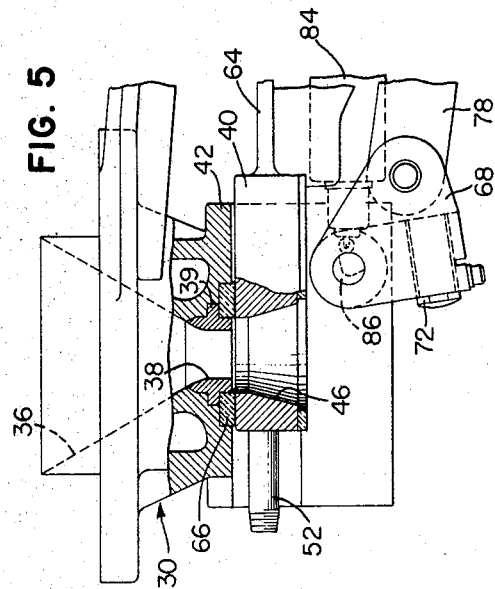
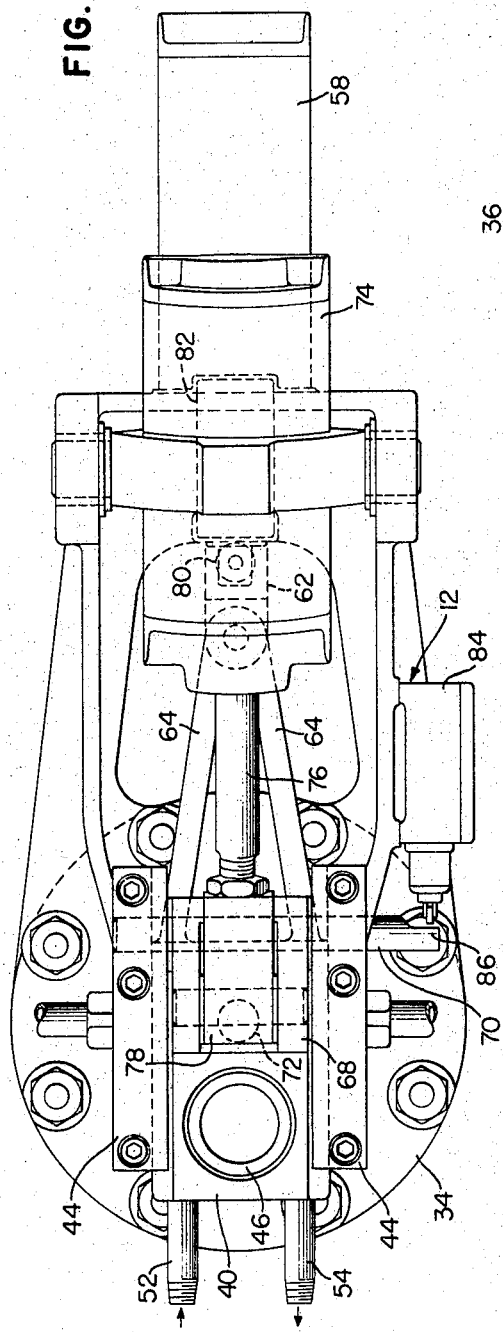
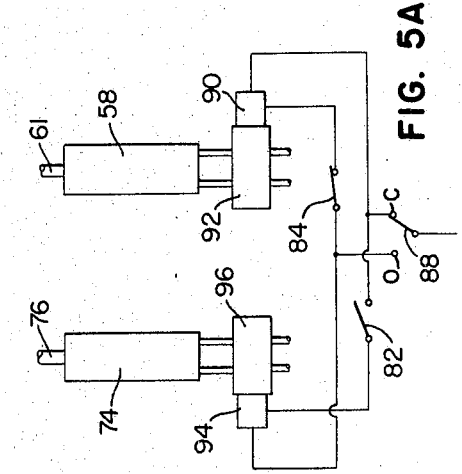
INVENTOR.
EVERETT D. GEORGE
BY
ATTORNEY Dec. 30, 1969  E. D. GEORGE  3,487,141
SYSTEM AND METHOD FOR THE MANUFACTURE OF POLYESTER AND THE LIKE
Filed July 14, 1967  4 Sheets-Sheet 4

INVENTOR.
EVERETT D. GEORGE
BY
ATTORNEY

United States Patent Office 3,487,141
Patented Dec. 30, 1969

3,487,141
SYSTEM AND METHOD FOR THE MANUFACTURE OF POLYESTER AND THE LIKE
Everett D. George, Cuyahoga Falls, Ohio, assignor to The Goodyear Tire & Rubber Company, Akron, Ohio, a corporation of Ohio
Filed July 14, 1967, Ser. No. 653,384
Int. Cl. B29d 7/10
U.S. Cl. 264—175                               27 Claims

ABSTRACT OF THE DISCLOSURE

A reactor system for the manufacture of polyester and like material comprising a reactor in which polymerization takes place with the reactor being provided with discharge means in the form of a straight-through, smooth walled flow passage for the discharge of material out of the reactor and into the atmosphere. A conveyor system is located below the valve for the reception of an unconfined continuous, generally circular cross-sectioned flow of material from the reactor. The conveyor system comprises a steel belt, the upper course of which passes through the nip of a pair of rolls for sheeting the circular cross-sectioned stream of material received by the upper course of the belt. The conveyor belt is sprayed with water to cool it and prevent sticking of the material to the belt. The roll contacting the material may also be water cooled either internally or externally, or both. Special valving is used to open and close the material discharge passage in the reactor.

---

The foregoing abstract is not to be taken as limiting the invention of this application, and in order to understand the full nature and extent of the technical disclosure of this application, reference must be made to the accompanying drawings and the following detailed description.

This invention relates to a system and method for the manufacture of polyester and like material, and more particularly relates to a novel and improved method and apparatus for shaping the discharge of polyester from a reactor to a generally wide, flat sheet form.

In the manufacture of polyester and the like the reaction products are mixed and polymerized in a vessel referred to as a reactor. The reaction process takes place under relatively high temperature, for example 575° F. After the reaction has been completed it is conventional to discharge the material from within the reactor through a valve in the bottom of the reactor and into a passage leading to a die or the like to provide a continuous relatively wide and thin sheet which is subsequently fed into suitable apparatus for dicing the strip, or in other words cutting it into relatively small pieces, or chips. The use of an extrusion die or the like for shaping the discharge of material from the reactor has in the past led to difficulties. These difficulties center around hang-up or lodging of material in the die, valving and passages leading from the valve to the die, particularly at the end of the discharge operation. This material, which becomes lodged in and does not pass through the die, passages, etc., becomes solid and causes contamination of subsequent material discharged through the die with the result that substantial portions of the subsequently discharged material must be scrapped with attendant loss of economy.

It is the primary object of the present invention to provide a novel and improved system and method for the manufacture of polyester and the like having novel and improved means for discharging the polymer from the reactor and for forming the discharged polymer into a wide, thin sheet for subsequent dicing which will at least substantially eliminate any retention of material in the reactor discharge passages which can cause contamination of subsequently discharged material.

Included within the primary object is the provision of novel and improved valve means for controlling the flow of material from a reactor and novel and improved means for conveying the polymer from a reactor and for forming the polymer into a relatively wide, thin sheet suitable for a subsequent dicing operation.

Other objects and advantages of the present invention will be in part apparent and in part pointed out in detail hereinafter.

Figures 1, 2:
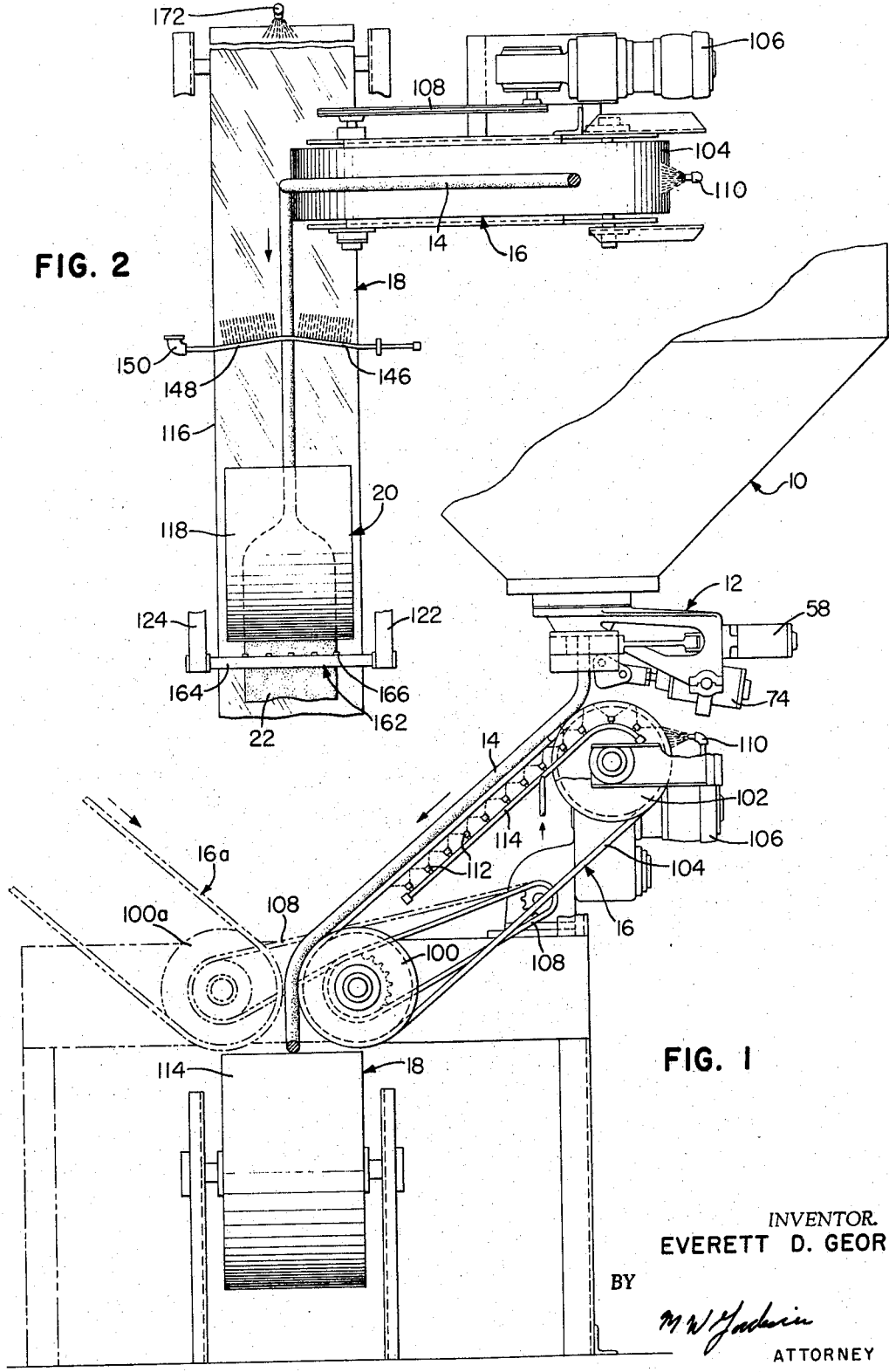
Figure 6:
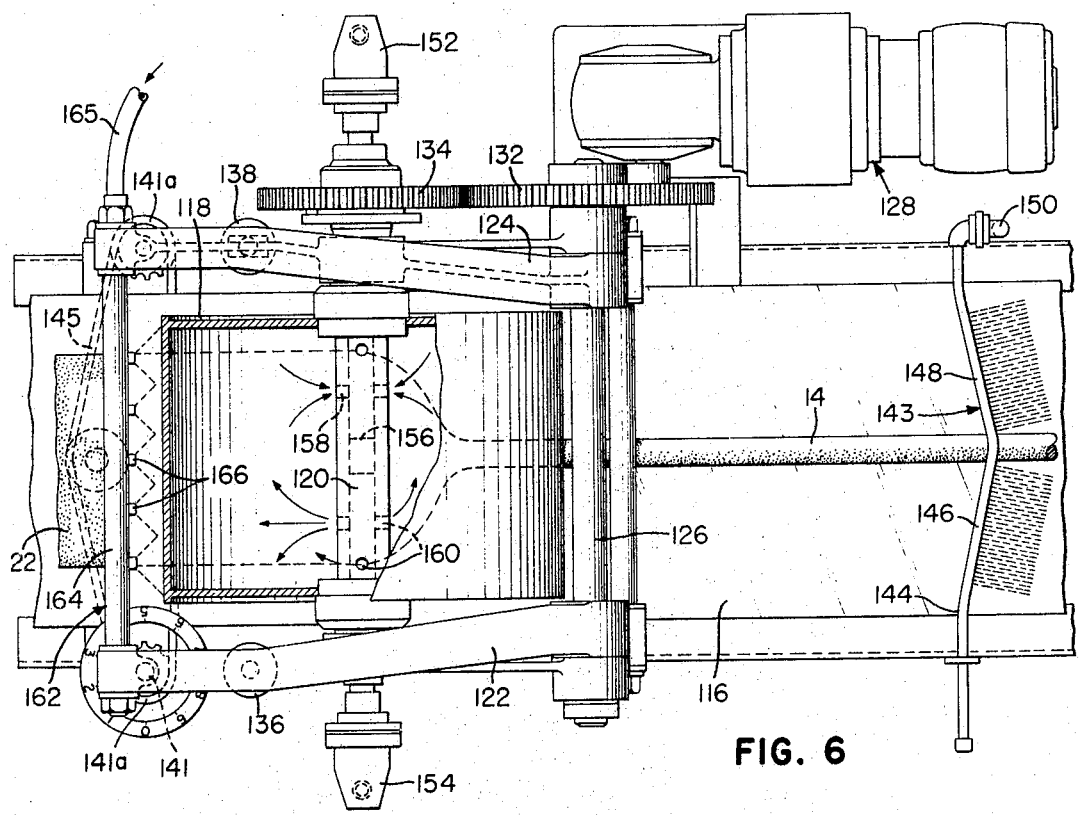
Figure 7:
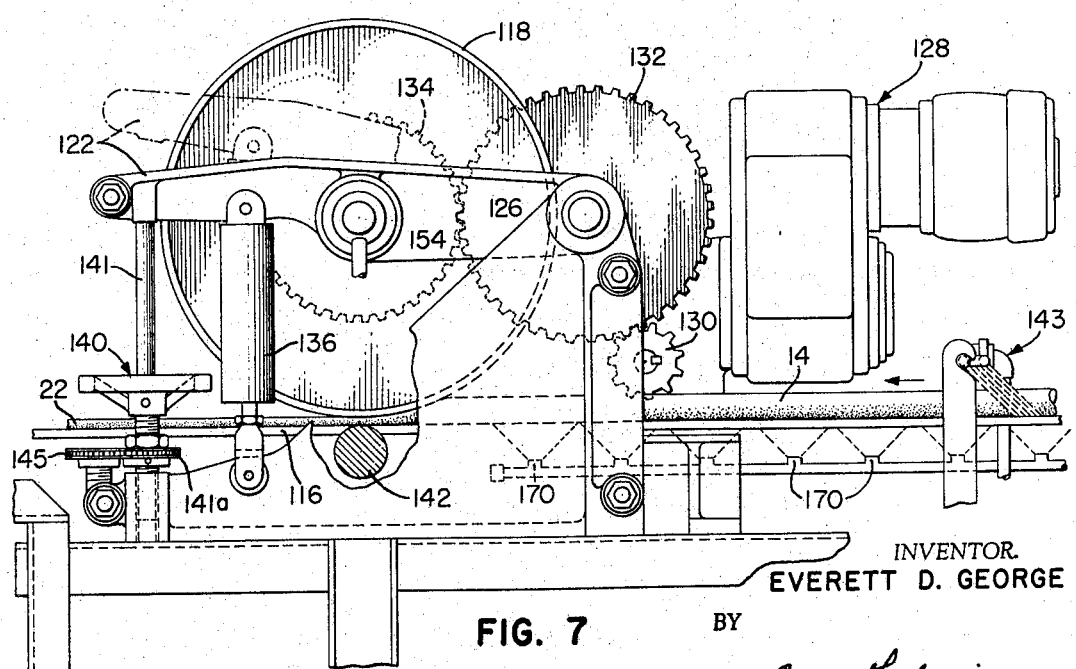

In the drawings:
FIGURE 1 is an elevational view partly in section of a reactor system incorporating the present invention;
FIGURE 2 is a plan view of a portion of the system of FIGURE 1;
FIGURE 3 is an enlarged elevational view partly in section of the valve of the system of FIGURE 1;
FIGURE 4 is a bottom view of the valve of FIGURE 3;
FIGURE 5 is a fragmentary cross-sectional view of a portion of the valve of FIGURE 3 with the valve being shown in the open condition;
FIGURE 5A is a schematic diagram of the control system for the valve of FIGURE 3;
FIGURE 6 is an enlarged plan view of a portion of the system of FIGURE 2 shown in greater detail and partly in section; and
FIGURE 7 is a side view of the portion of the system of FIGURE 6.

With reference to the drawings, and particularly FIGURE 1, the system of this invention includes a reactor 10 within which the reactants are mixed and heated to effect polymerization. Suitable means are provided for the fluid heating of the wall of the reactor to maintain the contents of the reactor at a controlled specified temperature, for example 575° F. Also suitable means, not shown, are provided for pressurizing the interior of the reactor so as to cause discharge of the reactor contents through an opening in the conical bottom of the reactor which is normally maintained closed by a valve 12 mounted on the reactor. The valve 12, as will be more clearly described hereinafter, is constructed to discharge the reaction product or material 14 vertically downwardly in a continuous unconfined stream having a generally circular cross-section. In the specific embodiment shown the material drops from the vlave onto an inclined cross conveyor generally indicated at 16 and which, as more clearly shown in FIGURE 2, deposits the material onto a horizontal second conveyor 18, which conveys the material to and through a system of rolls generally indicated at 20 which changes the configuration of the material from an elongate, generally circular cross-sectioned one to a relatively wide, flat and thin shape, as indicated at 22.

With reference to FIGURE 3, the reactor 10 is provided with a passage or passages 24 in the wall thereof through which may be circulated a heated fluid, such as oil, for maintaining the contents of the reactor at the desired relatively high temperature. The reactor is provided with a conical bottom wall 26 which tapers downwardly and terminates in a relatively large discharge opening 28 of circular cross-section. The valve 12 comprises a body 30 having an inlet portion 32 engaged within the opening 28 in the reactor. The body 30 has a circular flange 34 by which it is fixed to the reactor such as by bolts. The body 30 is provided with a through-bore or passage 36 which at its inlet end has a diameter equal to the external diameter of the inlet end 32 of the valve body and to the inner diameter of the opening 28 in the reactor. The passage 36 is of circular cross-section throughout its length and is progressively reduced in diameter from the inlet end of the passage inwardly of the valve body terminating in a constant diameter cylindrical passage 38 of relatively short length. It will be observed that the passage 38 of the valve is relatively short in that its total length is less than the diameter of the opening 28 in the reactor. Also it will be observed that the passage 36 is smooth walled by which, in this instance, is meant that the passage wall is free of any irregularities or surfaces extending predominately radially of the passage and which could cause hang-up of material passing through the passage. The lower end of the conical portion of the passage 36 as well as the cylindrical portion 38 of the passage is defined by a bore through a replaceable tubular insert 39. The fact that the insert 39 defines the lower portion of the conical portion of the passage 36 permits the insert to be replaced with an insert or inserts having a larger or smaller diameter at the outlet end so as to vary the flow rate from the reactor, as desired, but without adversely affecting the contour of the passage.

The valve 12 further comprises an elongated valve member or slide 40 which is generally rectangular in cross-section. The valve member is laterally guided by a pair of depending portions 42 on the valve body extending generally longitudinally of the valve member 40 and in the direction of the movement thereof. As best shown in FIGURE 4, the valve member is supported vertically by a pair of gibs 44 which are suitably fixed to the underside of the depending portions 42 on the valve body and which overlap the longitudinal edge portions of the valve member 40. The valve 40 is provided with a circular cross-sectioned opening or passage 46 extending through the valve member and having a central axis which is alignable with the central axis of the discharge end of passage 36 in the valve body. The inlet end of the passage 46 has a diameter which is substantially greater than the diameter of the outlet end of the passage 38 in the valve body. This is most clearly shown in FIGURE 5 wherein the valve member is shown in its open position with the passage 46 through the valve member being positioned concentrically with the passage 36 in the valve body. The passage 46 in the valve member is of uniform diameter for a short distance from its inlet end and then flares outwardly to its discharge end. Accordingly, material being discharged through the orifice 36 will not contact the walls of the passage 46 thus eliminating the possibility of hang-up of material on the wall of the passage 46.

The valve member 40 is further provided with an internal cavity 48 which is in registry with the outlet end of the passage 36 through the valve body when the valve member is in the closed position of FIGURE 3. It will be seen that the cavity 48 extends entirely across and beyond the outlet end of the passage 36. The cavity 48 is provided by an opening which extends inwardly of the valve member from the side thereof opposite the discharge end of the valve body passage 36 and terminates short of the opposite side of the valve member. The opening in the valve member is closed by a disc-like member 50 seated in a counter-bored recess in the underside of the valve member. A tube 52 is mounted on and extends from one end of the valve member and communicates at its inner end with an internal passage 53 in the valve member 40 which leads to the cavity 48. The tube 52 and the passage 53 is for the introduction of heated fluid within the cavity 48. With reference to FIGURE 4, a similar tube 54 is carried by the valve member for the flow of fluid from the cavity 48. The tube 54 communicates with a passage similar to the passage 53 within the valve member and leading to the cavity 48. In order to insure circulation of fluid within the cavity 48 the closure member, or disc, 50 is provided with a projection 56 which extends into the cavity 48 and forms a baffle extending from adjacent the central axis of the cavity to the wall of the cavity between the inner ends of the passages associated with the tubes 52, 54. Accordingly, fluid introduced through the tube 52 is constrained to flow substantially entirely about the cavity 48 before it can be discharged through the tube 54.

The valve member 40 is moved between its open and closed positions by an air motor 58 carried by a frame 60 fixed to the valve body 32. The motor 58 has a piston rod 61 carrying at its outer end a clevis 62 which is pivotally connected to the outer end of a valve stem 64 extending from one end of the valve member 40. In order to insure free movement of the valve member within its guideway, particularly in view of the large temperature differential to which the valve member is exposed, the valve member is relatively loosely guided as regards its vertical support by the gibs 44, thereby permitting limited vertical movement of the valve member. In order to insure adequate sealing by the valve member when in its closed position, an annular seal 66, such as of glass-filled Teflon, is carried by the valve body 32. The seal 66 is received in an annular recess in the valve body disposed concentrically of and about the outlet end of the passage 36. In order to assure that the seal 66 will not be dislodged during movement of the valve member 40, and as shown in FIGURE 5, the diameter of the inlet end of the passage 46 in the valve member is less than the outer diameter of the annular seal 66. Thus in any position of the valve member, the seal 66 will be in overlying relationship with a solid surface on the valve member entirely about the axis of the seal.

As previously mentioned, the valve member has limited vertical movement relative to the valve body. In order to assure a proper seal against pressure or vacuum within the reactor, the valve member 40, when in its closed position, is forced against the seal 66. It will be understood that the valve member has a top surface facing the seal which is substantially flat and fluid impervious in the portion thereof registering with the seal 66 when the valve member is in closed position. In order to force the valve member against the seal 66 a lever or crank 68 is pivotally mounted for movement about a horizontal axis by means of a shaft 70, which as most clearly shown in FIGURE 4, is journaled on the gibs 44. The crank 68 carries a threaded member 72 which is engageable with the underside of the valve member in coaxial relationship with the passage 36 through the valve body. The axis of the shaft 70 extends at right angles to, although spaced radially of and from, the axis of the passage 36, and the threaded mounting of the member 72 permits adjustment of the same to assure that the force exerted on the side 40 by the member 72 will be at right angles thereto.

The member or crank 68 is moved into and out of engagement with the slide by an air motor 74 the housing of which is pivotally supported on the frame 60 for movement about a horizontal axis extending parallel to the axis of the shaft 70. A piston rod 76 extends from the housing of the motor 74 and is threadably engaged at its outer end with one end of a mounting fixture 78 the other end of which is pivotally mounted on the crank 68 for movement relative thereto about an axis extending parallel to the axis of the shaft 70. The pivotal axis of the member 78 is in the specific embodiment shown spaced from the axis of the shaft 70 on the side thereof opposite the slide or valve member 40. When the valve member is in closed position, and the member 72 is bearing against it, the pivotal axis of the member 78 will be closely adjacent to the axis of the passage 36 in the valve body but spaced between that axis and the axis of the shaft 70. The threaded mounting of the piston rod 76 in the member 78 permits adjustment of the throw of the member 68 to insure that the member 72 will be aligned with the axis of the passage 36 when the valve member is in closed position and the member 72 is bearing thereagainst to seal the valve member against the seal 66. The threaded mounting of the member 72 permits adjustment of that member generally coaxially of the passage 36 to insure that with the member 72 aligned with the axis of the shaft the member 72 will be extended sufficiently to provide the desired sealing force on the slide 40.

As most clearly shown in FIGURE 3, the clevis 62 carries a cam 80 which cooperates with a follower on a normally open switch 82, which in a manner to be explained hereinafter, assures that the crank 68 will not be moved into clamping engagement with the valve member until the valve member has been completely closed. A second normally open switch 84 is also mounted on the frame 60 of the valve and has an actuating member which is engageable by a cam portion on the end of the shaft 70 mounting the bell crank 68. As most clearly shown in FIGURES 3 and 4, one end of the shaft 70 projects beyond one of the gibs 44 which journal the shaft. The outer end portion of the projecting end of the shaft 70 is reduced in cross-section over a portion of its periphery to provide the cam portion 86. The shaft 70 is positioned angularly about its axis with respect to the crank 68 so that when the crank is in the valve member engaging position shown in FIGURES 3 and 4, the cam portion 86 of the shaft 70 will be spaced out of engagement with the follower of the switch 84. However, during movement of the crank 68 in a counter-clockwise direction, as viewed in FIGURES 3 and 5, the cam follower on the switch 84 will ride up onto the unrelieved portion of the shaft 70 to effect actuation of the switch and close the same.

With reference to FIGURE 5A, the function of the switches 82 and 84 will now be explained. A two-position control switch 88 is provided for the purpose of controlling opening and closing movement of the valve. One contact C of the switch 88 is connected in series with one coil of a two-coil solenoid 90 which controls actuation of a four-way valve 92 operatively associated with the motor 58, which in a specific embodiment shown is a double-acting motor. The coil of the solenoid 90 to which the contact C is connected, is effective to actuate the four-way valve 92 to effect advancement of the piston rod 60 so as to move the valve member or slide 40 to closed position. The other coil of the solenoid 90, which when energized will effect actuation of the four-way valve 92 to cause the piston rod 60 to be retracted and the valve to be opened, is connected in series with the switch 84 and through the switch 84 to the contact O of the switch 88. The contact O of the switch 88 is also connected to one coil of a two-coil solenoid 94 associated with a second four-way valve 96, which is associated with the motor 74. The coil of the solenoid 94 to which the contact O is connected is effective when energized to actuate the four-way valve 96 and effect retraction of the piston rod 76 so as to cause the crank 68 to move out of engagement with the valve member. The other coil of the solenoid 94 is effective when energized to actuate the four-way valve 96 to cause advance of the piston rod 76 and attendant moving of the bell crank 68 into engagement with the valve member. The second coil of the solenoid 94 is connected in series through the normally open switch 82 to the contact C of the switch 88.

When it is desired to close the valve the switch 88 is moved to connect the contact C to a source of power. As shown in FIGURE 5A, the valve being in the open condition at this time, the switch 82 will be open and the switch 84 will be closed. The switch 84, however, cannot serve to actuate the solenoid 90 at this time, inasmuch as it is not connected to a source of power. The solenoid 90 will be actuated, however, to effect extension of the piston rod 60 to move the valve member toward and into its closed position. As the valve reaches its closed position the cam 80 will actuate the switch 82 to close the same and thus effect energizing of the solenoid 94 which in turn will effect actuation of the motor 74 to move the crank 68 into engagement with the valve member 40 and press the same firmly against the seal 66. When it is desired to open the valve, the switch 88 is moved to connect the contact O with a source of power. This will in turn immediately effect actuation of the solenoid 94 to cause the piston rod 76 to retract and move the crank 68 out of engagement with the valve member so as to permit the same to be freely moved in an opening direction. However, until the shaft 70 which is mounted for movement with the crank 68 is rotated sufficiently to cause the cam portion 86 to actuate the switch 84 and close the same, the motor 58 will be ineffective to move the slide or valve member 40 in an opening direction. As soon as the switch 84 has been actuated by the cam 86, after a predetermined amount of rotation of the cam, the solenoid 90 will be connected to a source of power so as to effect retraction of the piston rod 61, and thus movement of the slide 40, into its open position. From the foregoing it will be apparent that the crank 68 is operable only in response to movement of the slide into its closed position and that the slide may not be moved out of its closed position except in response to movement of the crank 68 out of engagement with the slide.

One of the features of the valve heretofore described, and as mentioned above, is the smooth walled flow passage through the valve body. It will also be observed that the only passage through the valve, the walls of which are in contact with the material passing through the valve, is the passage 36 in the valve body. The opening in the valve member through which the material passes is of substantially larger diameter, for example, one-half again as large as the diameter of the outlet end of the passage 36 in the valve body. Also it will be apparent that the closure of the passage 36 occurs at the extreme outer end thereof, and not intermediate the ends of the passage through the valve body as is conventional in the usual valve. This feature, together with the smooth walls of the passage 36 and the large opening in the valve member 40, eliminates hang-up of material as it is passing through the valve, and particularly eliminates any hang-up of material in the valve member itself. It has been previously noted that the valve member is provided with internal means for circulating heating fluid. The valve body is likewise provided with internal passages for the circulation of hot oil, or the like therethrough.

With reference again to FIGURES 1 and 2 in the specific embodiment shown, the material discharging from the reactor is received on the upper course of an endless belt conveyor 16 which is inclined to the horizontal and serves to convey the material to the horizontal conveyor 18. The conveyor 16 comprises a pair of drums or sheaves 100, 102 which support an endless stainless steel belt 104. The drum 102 is driven by a variable speed drive means such as an electric motor and gear reduction unit 106. In the embodiment shown in FIGURE 1, a second inclined transfer conveyor 16A is provided for handling material discharged from a second reactor (not shown). The drum 100A corresponding to the drum 100 of the conveyor 16 is driven by a belt or chain 108 which also drives the drum 100, the belt 108 being connected to the variable speed drive 106. In order to prevent the hot polyester from adhering to the surface of the belt 104 a water spray nozzle 110 is arranged to discharge water onto the outer surface of the belt. The nozzle is directed so as to discharge water toward and into contact with the center portion of the belt which is the portion of the belt to be engaged by the polyester. The nozzle is located adjacent the upper drum 102 but below the topmost portion of the drum, or more particularly the maximum elevation reached by the belt 104. Preferably the nozzle is located on the side of a line extending between the centers of the drums 100 and 102 opposite from the upper course of the belt. This location and orientation of the nozzle will result in only a very thin film of water being carried on the outer surface of the belt as the majority of the water discharged from the nozzle will strike the belt and fall vertically downwardly. It is only desired to provide a thin film of water on the belt and not a large quantity of water, which could cause blistering of the polyester material when this hot material came into contact with such a large quantity of water.

Because of the rather extreme temperature differential to which the belt is exposed due to the hot material contacting and supported by the center of the belt, a series of water spray nozzles 112 are located under the upper course of the belt 104 and extend in alignment generally along the longitudinal centerline of the belt which is the area of the belt which should support the polyester material 14. The nozzles 112 are fed from a common manifold 114. The nozzles are arranged preferably from a point approximately opposite the discharge of the nozzle 110, and prior to the point of initial engagement between the material 14 and belt, to a point closely adjacent the lower drum 100. It will be understood that where a second conveyor 16A is provided it too will be provided with water-cooling means such as just described in connection with the conveyor 16.

In order to assure that the material 14 will not neck down or in other words reduce in cross-section by any significant amount as it falls vertically from the reactor into contact with the upper course of the conveyor 16, the point of initial contact of the belt 104 with the material should be sufficiently closely spaced to the outlet end of the passage 36. For example, it has been found that where the outlet end of the valve passage has a diameter of approximately 1½ inches, polyester should be permitted to drop unsupported only for a distance of approximately 9 inches. It will be understood that this distance will, of course, vary with the diameter of the material being discharged from the valve, as well as the specific material itself. Where the conveyor 18 serves only one reactor it will be apparent that the cross conveyor 16 may be dispensed with and the conveyor 18 located immediately under and sufficiently closely adjacent to the discharge end of the valve 12.

As clearly shown in FIGURE 2, the conveyor 18 extends at right angles to the conveyor 16 and is disposed immediately thereunder. The conveyor 18 comprises a pair of drums or sheaves 114, only one of which is shown, which support an endless stainless steel belt 116. As the material 14 reaches the end of the conveyor 16 it is deposited onto the upper surface of the upper course of the belt 116 intermediate the ends of the belt and at or adjacent to the longitudinal centerline of the belt. The material passes along the conveyor 16 toward the system of rolls 20, which are more clearly shown in FIGURES 6 and 7. The roll system comprises an upper relatively large diameter roll 118 which is rotatably mounted at each end on a tubular shaft 120 which is fixedly mounted intermediate the ends of a pair of arms or levers 122, 124. One end of each arm 122, 124 is pivotally mounted on a shaft 126 extending parallel to the axis of the roll 118, and thus at right angles to the longitudinal centerline of the conveyor belt 116. The shaft 126 is suitably supported above the belt 116 on the main frame of the conveyor 18. The roll 118 is driven by a variable speed drive means 128, such as a variable speed electric motor and gear reduction unit. The drive means 128 is connected to a gear 130 which is in mesh with a gear 132 rotatably mounted coaxially of the longitudinal axis of the shaft 126 and thus the pivotal axis of the arms 122, 124. The gear 132 is in mesh with a gear 134 rotatably mounted on the shaft 120 coaxially of the shaft and is fixed relative to the roll 118.

A pair of air motors 136, 138 are respectively associated with the arms or levers 122, 124. Each of the air motors is pivotally connected at its upper end to the respective arm and at its lower end is pivotally connected to the main frame of the conveyor. The air motors are operative to exert a force on the arms 122, 124 in opposite directions about the axis of the shaft 126 in order that the roll 118 may be moved toward and away from the upper surface of the upper course of the belt 116. Suitable adjustable stop means as at 140 are provided for engagement with the outer ends of each of the arms 122, 124 to limit movement of the roll 118 toward the belt 116. The stop means include vertical rods 141 the upper ends of which are engageable by the arms 122, 124, the lower ends of the rods 141 are threadably mounted so as to be longitudinally adjustable to permit the roll 118 to be located at a variable and preselected distance from the belt 116. The rods 141 are connected by sprockets 141a on the rods and a chain 145 to permit simultaneous adjustment of the rods thus providing accurate control of the thickness of the material passing out of the roll system. Disposed beneath and supportingly engaging the underside of the upper course of the belt 116 is a relatively small diameter anvil roll 142. The anvil roll is not driven and is mounted on the main frame of the conveyor for rotation about an axis which is parallel to the axis of the roll 118 and lies in a vertical plane passing through the axis of the roll 118.

It will be observed that the belt 116 passes between the rolls 118 and 142, or in other words through the nip of these rolls, so that the material 14 is supported on the upper course of the belt as it passes through the nip of the rolls and is rolled into a relatively wide and thin sheet. As the material is passing through the nip of the rolls 118, 142 any excess water on the top surface of the belt may cause blistering of the material as the material is pressed so as to flow laterally outwardly of the belt. Accordingly, and as most clearly shown in FIGURES 2 and 7, air-wiper means 143 are provided intermediate the roll 118 and the point of initial engagement of the material with the conveyor 18 and spaced from the roll 118 in a direction opposite the direction of movement of the upper course of the conveyor. The air-wiper means comprises a tubular member 144 extending generally laterally across and spaced above the upper course of the belt 116. The tubular member or manifold 144 has a pair of portions 146, 148 intermediate its ends and lying respectively on opposite sides of the longitudinal centerline of the belt 116. Each of the portions 146, 148 extends from the end thereof next adjacent the centerline of the belt laterally outwardly of the belt and toward the roll means 20, or in other words in the direction of movement of the top course of the belt. Each portion 146, 148 of the tubular member 144 is provided with openings facing generally downwardly toward the upper surface of the belt 116 and in a direction opposite the direction of movement of the upper course of the belt. Pressurized air is introduced through the end 150 of the tubular member 144, the other end of the tubular member being sealed. The air will be discharged through the openings in the portions 146, 148 of the tubular members so as to be directed in two streams diverging downwardly and into contact with the upper surface of the belt with the air discharged at an angle to the top surface of the belt and in a direction opposite the direction of movement of the top course of the belt. The innermost opening in each of the tubular portions 146, 148 next adjacent the longitudinal centerline of the belt is spaced a substantial distance from said centerline and preferably a distance at least equal to one-half the width of the diameter of the material passing under the air-wiper means. In this manner, and because of the inclination of the tubular members 146, 148 in a horizontal plane, as aforedescribed, the air discharged by the air-wiper means will not contact the material on the upper course of the belt, thus reducing any tendency of the air stream to cool the same. On the other hand, the air streams are directed so as to tend to blowoff any water on the top surface of the belt on either side of the material 14 conveyed thereon.

In order to assure that the material 14 will not stick to the surface of the roll which engages the material the interior of the peripheral wall of the roll is cooled. In this connection cooling water may be introduced through a fixture 152 at one end of the shaft 120 projecting outwardly from one end of the roll 118. The cooling water is discharged through a fixture 154 at the opposite projecting end of the shaft 120. A plug 156 is located at the mid-point of the tubular shaft 120 at a point coinciding generally with the center of the roll 118. The plug 156 prevents direct flow of water through the tubular shaft 120 from one end thereof to the other. The shaft 120 is provided with a plurality of openings 158 in the wall thereof and located between the plug 156 and the end of the roll 118 next adjacent the inlet fixture 152. The shaft 120 is provided with additional openings 160 disposed on the opposite side of the plug 156 from the openings 158. Accordingly, water flowing into the shaft will flow radially outwardly thereof through the openings 158 and into the interior of the drum. When the water in the drum has reached a sufficient height it will flow radially inwardly of the shaft through the openings 160 and thence outwardly of the shaft through the fixture 154.

In order further to assure that the polyester material will not adhere to the external surface of the drum 118 water-spray means 162 are provided. More particularly and with reference to FIGURES 2, 6 and 7, a tubular member or manifold 164 is carried by the outer free ends of the arms 122, 124 which support the roll 118. One end of the manifold 164 is adapted to be connected by suitable conduit 165 to a source of water under pressure. The other end of the manifold 162 is sealed. Intermediate its ends the manifold 164 is provided with a plurality of nozzles or openings 166 which are directed toward the next adjacent peripheral surface of the roll. As will be apparent from a consideration of the drawings, the manifold 164 extends parallel to the rotational axis of the drum 118 and is spaced from the drum in a direction of movement of the upper course of the belt 116. The manifold 164 is further located slightly vertically above the axis of the drum 118 and the nozzles or openings 166 are directed angularly downwardly from the horizontal. Accordingly, water discharged from the manifold will strike the vertically upwardly moving surface of the roll inasmuch as the roll is rotated in a clockwise direction, as viewed in FIGURE 7. Also, the water will initially strike the roll in an area located vertically below a horizontal plane passing through the rotational axis of the roll. Therefore, only a very thin film of water will be carried upwardly by the roll surface so as to assure that there will be only a minor amount of water on the roll surface when the roll engages the material 14.

Additional water cooling means are provided for the upper course of the belt 116. As shown in FIGURE 7, a plurality of nozzles or the like 170 are located beneath the upper course of the belt and are directed upwardly against the underside of the belt. The nozzles or the like 170 are spaced apart longitudinally of the belt generally along the longitudinal axis thereof which is the area of the belt which will be contacted by the hot polyester material 14 as it travels down the conveyor to the roll means 20. The cooling of the center portion of the upper course of the belt tends to minimize the extreme temperature differential which would otherwise exist in the upper course of the belt due to the engagement of the very hot material 14 only with the center portion of the belt. A water spray nozzle or the like 172 is located adjacent the sheave 114 on the upstream side of the roll means. The nozzle 172 is directed toward the roll 114 so that the water discharged therefrom will engage the outer surface of the portion of the belt wrapping the sheave at a point below the uppermost point on the sheave. The spray means 172 serves a purpose similar to the spray means 110 associated with the belt 104.

In the operation of the system described above when it is desired to discharge material from the reactor the valve 12 is opened in the manner described above to permit material to flow out of the reactor and directly onto the conveyor system, whether it be the cross conveyor 16 or a main conveyor system such as the conveyor 18. The speed of the conveyor system and press rolls are adjusted through the variable speed drives thereof so that they are moving at the same surface speed as that of the material being discharged from the reactor. The material is discharged from the reactor normally under a pressure head which is increased above atmospheric pressure by means of the introduction of pressurized gas into the reactor above the material therein. As heretofore noted, the valve 12 is capable of sealing the reactor against the internal pressure thereof as well as against a partial vacuum which may exist within the reactor at certain times during the process.

While the system has been described in part in terms of the specific valve 12 utilized in the system, it should be noted that this valve is somewhat unusual in that the valve body serves primarily to reduce the cross-sectional area of the opening in the bottom of the reactor and the valve member is mounted at the outlet end of the only flow passage through the valve body. Thus, for all intents and purposes, the material in the reactor is discharged directly therefrom and into the atmosphere without passing through any passages other than what is a short discharge passage in the bottom of the reactor. The stream of material discharged from the reactor is unconfined between the time it leaves the reactor and is rolled out. Thus, there is nothing in the system which can cause any lodging or hang-up of material during the discharge cycle. From the foregoing it will be seen that, if desired, the reactor may be suitably constructed so that the valve body 32 is formed as an integral part of the reactor rather than being a detachable insert as in the specific embodiment. Other changes and modifications will be apparent to those skilled in the art and it is intended therefore that the foregoing description be taken merely as illustrative of the invention and not in a limiting sense.

What is claimed:

1. In a system for manufacturing polyester and like material, a reactor containing a discharge opening, means aligned with said discharge opening providing a short vertically directed smooth walled discharge passage in the bottom of said reactor whereby material in said reactor may be discharged under pressure directly into the atmosphere in a vertically downwardly directed continuous unconfined and unguided stream, and roll means having a nip disposed in the path of movement of the unconfined stream of material discharged from the reactor and operative to roll said stream into a ribbon having a width substantially greater than its thickness.

2. In a system as described in claim 1, said discharge passage having a substantially circular cross-section throughout its length, and means for closing the outlet end of said passage comprising a valve member mounted for movement between an open and closed position relative to said outlet end, said valve member when in said open position thereof being spaced in a direction radially of the axis of said passage and entirely about said axis a substantial distance from the periphery of said outlet end to avoid contact of said valve member with a stream of material discharging from said reactor.

3. In a system as described in claim 2, said valve member being mounted for limited movement in a direction generally parallel to the longitudinal axis of said passage and for rectilinear movement in opposite directions extending generally across said outlet end, sealing means fixed relative to one of the reactor and valve member and disposed generally concentrically about said outlet end when said valve member is in closed position, means for moving said valve member in opposite directions across said outlet end, means for moving said valve member longitudinally of said passage and into sealing relationship with said outlet end of said passage in response to movement of said valve member into said closed position.

4. In a system as described in claim 3, said means for moving said valve member into said sealing relationship including clamping means movable into and out of engagement with said valve member, said means for moving said valve member across said outlet end of said passage being operative to move said valve member out of closed position in response to movement of said clamping means in a valve member disengaging direction.

5. In a system as described in claim 3 said sealing means comprising an annular seal surrounding said outlet end of said passage, said seal having an inner diameter substantially larger than the diameter of said outlet end and being mounted in fixed relation to said reactor, said valve member having a fluid impervious first portion registerable with said outlet end of said passage and engageable with said seal when the valve member is in closed position, said valve member further having a second portion contiguous with said first portion, said second portion being provided with an opening of substantially greater diameter than and registerable with said outlet end of said passage when the valve member is in open position, said opening in said second portion having a diameter which is less than the outer diameter of said annular seal.

6. In a system as described in claim 1, said reactor having a conical bottom portion terminating in said discharge opening, said discharge opening being circular in cross section, said means providing said discharge passage comprising a valve body coaxially engaged within said opening and having a continuous flow passage extending therethrough and coaxial with said opening, said flow passage at its inner end having a diameter substantially the same as the diameter of said opening and terminating at a wall on the reactor defining said opening, said flow passage being smooth walled and of substantially circular cross-section over its entire length, a slidable valve member guided for horizontal movement across the outlet end of said flow passage and for limited vertical movement longitudinally of said passage, a crank pivotally supported on said valve body for movement about a horizontal axis, means on said crank engageable with the underside of said valve member to force the same upwardly and into sealing relation with said outlet end of said passage, and means for pivoting said crank between a valve member engaging first position and a second position wherein said crank is spaced out of engagement with said valve member and is spaced radially from the axis of said flow passage a distance greater than the radius of said outlet end of the passage so as to be out of contact with the stream of material discharging from said passage.

7. In a system as described in claim 6, means for moving said valve member out of closed position and toward open position in response to movement of said crank in a valve member disengaging direction, said means for pivoting the crank being responsive to move the same out of said second position and toward said first position in response to movement of the valve member into closed position.

8. In a system as described in claim 2, said reactor having a conical bottom wall terminating in said discharge opening, said discharge opening being circular in cross section, said means providing said discharge passage comprising valve means including a valve body coaxially engaged within said opening and having a continuous flow passage extending therethrough, said flow passage having a length no greater than the diameter of said opening, said valve member being mounted on said valve body at the outer end of said flow passage, said flow passage being smooth walled and having an outer end which has a substantially lesser diameter than its inner end, the inner end of said flow passage having a diameter at least substantially equal to the diameter of said opening and forming a continuation of the surface on the reactor defining said opening.

9. In a system as described in claim 8, said flow passage at the outer end portion thereof being defined by a replaceable insert mounted in the valve body whereby the outlet diameter of said flow passage may be varied.

10. In a system as described in claim 1, said roll means comprising a pair of rolls defining said nip, and an endless conveyor belt having an upper course passing through said nip, the upper surface of said upper course being adapted to receive material discharged from said reactor so as to carry the same through said nip.

11. In a system as described in claim 10, said belt being of metal, and water spray means directed against the portion of the surface of said belt intended to support said material and at a location on the belt prior to the point of intended initial engagement of the material with the belt.

12. In a system as described in claim 11, a pair of sheaves for supporting the ends of said belt, said spray means being located adjacent the one sheave of said pair thereof which is on the side of said point of initial engagement opposite said pair of rolls, said spray means being directed against the outer surface of the portion of the belt wrapping said one sheave and at a location below the uppermost point of said portion of the belt.

13. In a system as described in claim 12, said belt being disposed directly below said discharge passage and closely adjacent thereto to permit said material to be discharged directly onto the belt from said reactor.

14. In a system as described in claim 10, air-wiper means located over said upper course and between said roll means and the point of initial engagement between the belt and material to be conveyed thereby and providing two streams of air directed onto the upper surface of said upper course in an inclined direction away from said roll means and laterally outwardly of said belt so as to remove water from said upper surface prior to passage of the belt through said nip.

15. In a system as described in claim 10, the upper one of said pair of rolls being of substantially larger diameter than the lower one of said pair, and means for selectively adjusting the spacing of the axis of the upper roll from the axis of the lower roll.

16. In a system as described in claim 10, the upper one of said pair of rolls being of substantially larger diameter than the lower one of said pair, and water spray means adjacent said upper roll and directed onto the material engaging surface of the roll on the side of the axis thereof opposite the point of initial engagement of the belt and material to be conveyed thereby and at a location below the uppermost point of said material engaging surface of the roll.

17. In a system as described in claim 16, means for circulating cooling water internally of and through said upper drum.

18. In a system as described in claim 14, an inclined conveyor extending laterally of and upwardly from said conveyor belt for conveying material from said discharge passage in the reactor to said conveyor belt, said inclined conveyor including a second endless metal belt trained over two sheaves, water spray means directed against the outer surface of the portion of said second belt wrapping the upper one of said two sheaves at a location below the uppermost point on said upper one of said two shelves, and water spray means for directing water against the underside of the upper course of said second belt and disposed generally longitudinally along said underside at least generally in the center thereof so as to cool the portion of the belt engaged by material carried thereby.

19. In a system as described in claim 10, water spray means disposed along and directed upwardly toward the underside of the upper course of said belt, said water spray means being disposed over the portion of said upper course extending between said nip and the point of initial engagement with the belt of material discharged from the reactor and located generally along the centerline of the belt so as to cool the portion of the belt engaged by the hot material carried thereby.

20. In a system as described in claim 10, said reactor having a conical bottom portion terminating in said discharge opening, said discharge opening being circular in cross section, said means providing said discharge passage comprising a valve body coaxially engaged within said opening and having a continuous flow passage extending therethrough and coaxially with said opening, said flow passage at its inner end having a diameter substantially the same as the diameter of said opening and terminating at a wall on the reactor defining said opening, said flow passage being smooth walled and of substantially circular cross-section over its entire length, a slidable valve member guided for horizontal movement across the outlet end of said flow passage between an open and a closed position, said valve member when in the open position being spaced from the periphery of the outer end of said flow passage whereby material will be discharged from said outer end directly into the atmosphere.

21. In a method of manufacturing polyester and like material utilizing a reactor for containing the material at elevated temperature and pressure and in molten condition; the improvement of discharging the material vertically downwardly and directly from the reactor and into the atmosphere in a continuous unconfined and unguided stream, and rolling said stream of material while still hot into a continuous ribbon having a width substantially greater than its thickness.

22. In a method as described in claim 21, maintaining the cross-sectional area of said stream at least substantially constant from the time the stream is discharged from the reactor until the rolling of the stream is initiated while at the same time maintaining the stream exposed to atmosphere and unconfined.

23. In a method as described in claim 22, discharging said material from the reactor in a stream having a substantially circular cross-section.

24. In a method as described in claim 21, contacting and supporting said stream with a conveyor after discharge of the stream from the reactor and before rolling of the stream and including initially contacting the stream with the conveyor at a point on the conveyor spaced from the point of discharge of the stream from the reactor a distance less than that at which significant necking of the stream will occur.

25. In a method as described in claim 21, wherein the rolling of said stream comprises supporting the stream on a metal conveyor belt and passing the belt and stream supported thereon through the nip of a pair of rolls.

26. In a method as described in claim 25, contacting the surface of the belt supporting the stream with water prior to initial contact of the stream with the belt.

27. In a method as described in claim 26, directing pressurized air against the surface of said belt supporting said stream prior to passing the stream through said nip in order to remove water from said surface.

References Cited

UNITED STATES PATENTS

| | | | |
|---|---|---|---|
| 1,880,110 | 9/1932 | Shapiro | 264—175 |
| 1,975,481 | 10/1934 | Schnible | 222—559 |
| 2,221,019 | 11/1940 | Clarke | 264—169 |
| 3,032,815 | 5/1962 | Gerber | 264—216 |
| 3,110,547 | 11/1963 | Emmert | 264—176 |
| 3,118,577 | 1/1964 | Estabrook | 222—511 |
| 3,141,578 | 7/1964 | Quinn | 222—559 |

FOREIGN PATENTS 1,036,783   7/1966   Great Britain.

ROBERT F. WHITE, Primary Examiner

J. R. THURLOW, Assistant Examiner

U.S. Cl. X.R.

18—4, 15; 23—285; 222—559; 260—75; 264—216, 331